US012656152B2

(12) United States Patent　　　　(10) Patent No.:　US 12,656,152 B2

Irle et al.　　　　　　　　　　　　　(45) Date of Patent:　Jun. 16, 2026

---

(54) INDUCTIVE LINEAR POSITION SENSOR

(71) Applicant: HELLA GmbH & Co. KGaA, Lippstadt (DE)

(72) Inventors: Henning Irle, Lippstadt (DE); Sebastian Forst, Kamen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 168 days.

(21) Appl. No.: 18/224,317

(22) Filed: Jul. 20, 2023

(65) Prior Publication Data

US 2023/0358571 A1　　Nov. 9, 2023

Related U.S. Application Data

(63) Continuation of application No. PCT/EP2021/081028, filed on Nov. 9, 2021.

(30) Foreign Application Priority Data

Jan. 21, 2021　(DE) ..................... 10 2021 101 209.0
Jul. 13, 2021　(DE) ..................... 10 2021 118 019.8

(51) Int. Cl.
　　G01D 5/20　　　　(2006.01)
　　B62D 15/02　　　(2006.01)
　　G01D 5/245　　　(2006.01)

(52) U.S. Cl.
　　CPC ....... G01D 5/2053 (2013.01); B62D 15/0225 (2013.01); G01D 5/2452 (2013.01); G01D 2205/10 (2021.05)

(58) Field of Classification Search
　　CPC .............. G01D 5/2053; G01D 5/2452; G01D 2205/10; B62D 15/0225
　　See application file for complete search history.

(56) References Cited

U.S. PATENT DOCUMENTS

| | | | | |
|---|---|---|---|---|
| 3,768,094 | A | * | 10/1973 | Henrich .............. G01D 5/2013 341/15 |
| 4,820,961 | A | * | 4/1989 | McMullin ........... G01D 5/2053 318/587 |
| 5,841,274 | A | * | 11/1998 | Masreliez ........... G01D 5/2053 336/131 |
| 5,886,519 | A | | 3/1999 | Masreliez et al. |
| 6,011,389 | A | * | 1/2000 | Masreliez ........... G01D 5/2053 324/207.17 |

(Continued)

FOREIGN PATENT DOCUMENTS

| | | |
|---|---|---|
| DE | 102018102698 A1 | 8/2019 |
| DE | 102019209494 A1 | 1/2020 |

(Continued)

OTHER PUBLICATIONS

International Search Report dated Feb. 28, 2022 in corresponding application PCT/EP2021/081028.

*Primary Examiner* — Steven L Yeninas

(74) *Attorney, Agent, or Firm* — Muncy, Geissler, Olds & Lowe, P.C.

(57)　　　　　ABSTRACT

An inductive linear position sensor, wherein the linear position sensor comprises a stator having at least one excitation coil and at least one sensor receiver coil, at least one movable element which is linearly movable relative to the stator, and an evaluation circuit.

12 Claims, 6 Drawing Sheets

(56)                References Cited

U.S. PATENT DOCUMENTS

| | | | | |
|---|---|---|---|---|
| 6,384,598 | B1 * | 5/2002 | Hobein | G01D 5/2046 |
| | | | | 318/660 |
| 6,545,461 | B1 * | 4/2003 | Miyata | G01D 5/2053 |
| | | | | 324/207.17 |
| 7,726,692 | B2 * | 6/2010 | Ozaki | B62D 1/04 |
| | | | | 74/543 |
| 9,772,202 | B1 * | 9/2017 | Cook | G01B 3/205 |
| 9,958,296 | B2 | 5/2018 | Heumann et al. | |
| 10,551,217 | B2 | 2/2020 | Cook | |
| 10,876,861 | B2 | 12/2020 | Howard et al. | |
| 2001/0003422 | A1 * | 6/2001 | Andermo | G01D 5/2495 |
| | | | | 324/207.17 |
| 2002/0050417 | A1 * | 5/2002 | Berg | B62D 15/0225 |
| | | | | 180/446 |
| 2013/0090890 | A1 * | 4/2013 | Meyer | G01D 5/2452 |
| | | | | 702/150 |
| 2013/0158806 | A1 * | 6/2013 | Sugiyama | B62D 6/02 |
| | | | | 701/41 |
| 2014/0167746 | A1 * | 6/2014 | Tiemann | G01B 7/30 |
| | | | | 324/207.17 |
| 2015/0219434 | A1 * | 8/2015 | Tsuji | G01D 5/202 |
| | | | | 324/207.17 |
| 2016/0146636 | A1 * | 5/2016 | Nahum | G01D 5/2053 |
| | | | | 324/207.17 |
| 2016/0152259 | A1 * | 6/2016 | Donetti | B62D 5/006 |
| | | | | 180/402 |
| 2017/0160102 | A1 * | 6/2017 | Heumann | G01D 5/2013 |
| 2019/0245411 | A1 * | 8/2019 | Strieter | F16H 7/02 |
| 2019/0301895 | A1 * | 10/2019 | Cook | G01B 3/205 |
| 2020/0003583 | A1 * | 1/2020 | Cook | G01D 5/2046 |
| 2020/0114952 | A1 * | 4/2020 | Mayer | B62D 5/0481 |
| 2020/0231209 | A1 * | 7/2020 | Walentowski | B62D 15/0215 |
| 2020/0361523 | A1 * | 11/2020 | Nakamura | B62D 15/0235 |
| 2021/0341312 | A1 * | 11/2021 | Lange | G01B 7/003 |
| 2022/0115932 | A1 * | 4/2022 | Schmitt | G01D 5/2452 |
| 2023/0296416 | A1 * | 9/2023 | Brajon | G01D 18/001 |
| | | | | 324/207.25 |

FOREIGN PATENT DOCUMENTS

| | | |
|---|---|---|
| DE | 102019207070 A1 | 11/2020 |
| EP | 0289033 A2 | 11/1988 |
| EP | 3179214 A1 | 6/2017 |
| EP | 3479072 A1 | 5/2019 |
| JP | H10213408 A | 8/1998 |

* cited by examiner

INDUCTIVE LINEAR POSITION SENSOR

This nonprovisional application is a continuation of International Application No. PCT/EP2021/081028, which was filed on Nov. 9, 2021, and which claims priority to German Patent Application No. 10 2021 101 209.0, which was filed in Germany on Jan. 21, 2021 and German Patent Application No. 10 2021 118 019.8, which was filed in Germany on Jul. 13, 2021, and which are all herein incorporated by reference.

BACKGROUND OF THE INVENTION

Field of the Invention

The present invention relates to an inductive linear position sensor, such as that which can be used, for example, for a steering system of a vehicle; a steering system of a vehicle as well as a vehicle.

Description of the Background Art

An embodiment of an inductive position sensor is known from DE 10 2018 102 698 A1. The position sensor is designed with a moving part in relation to a stator and a three-dimensional cursor arranged on it. The moving part and the cursor are rotatably arranged around a common axis of rotation. The position sensor is thus designed as an inductive angle of rotation sensor for detecting an angle of rotation of the moving part in relation to the stator.

It has been shown that the described inductive angle of rotation sensor is particularly advantageous for certain applications in the vehicle with small movements, such as variable camshaft adjustment.

On the other hand, for some applications, such as a steering system of a vehicle, it would be desirable to improve the inductive angle of rotation sensor due to the ambiguity of possible multiple revolutions resulting from the multiple turns of the steering wheel movement in steering systems, also known as the multi turn problem, due to the interpretation of its measurement results, or to use another sensor that is better able to cope with these applications. This is because the detection due to the multiple revolutions of the steering wheel movement is complicated from a sensory point of view, because the multiple revolutions (often also referred to as multi turn) have to be counted or reduced.

With future steer-by-wire steering systems, the problem of ambiguity may increase because the steering column is omitted and the wheel angle of the steering is to be understood as a position control task. This is in contrast to today's power steering in vehicles, which primarily regulates the torque, i.e., a support of the force applied by the driver to the steering wheel.

For position control in steer-by-wire steering systems, a target position and precise actual position detection are necessary.

In some automotive applications, such as the steering system, comparatively long distances of approx. 20 to 30 cm can also be measured. This makes inductive position sensors, especially in the design as inductive angle of rotation sensors and in addition to the problem of ambiguity, very large and comparatively expensive.

In the same way, there are other measuring locations for such position sensors as described here with a comparatively large measuring range on the spring deflection, shock absorbers of vehicles or on the seat rail of vehicles. Other than in vehicles, applications can be found in machine tools with corresponding X-Y adjustment tables or in plant engineering or on production lines.

SUMMARY OF THE INVENTION

It is therefore an object of the present invention to specify an improved inductive position sensor that can be used equally advantageously for automotive and other applications, in particular can measure comparatively long distances in a compact and inexpensive design and does not have the problem of ambiguity with regard to rotatably coupled measuring systems.

Features and details described in connection with the linear position sensor according to the invention also apply in connection with the steering system according to the invention and the vehicle according to the invention and vice versa, so that the disclosure of the individual aspects of the invention is or can always be referred to mutually.

According to a first aspect of the invention, the object is achieved by an inductive linear position sensor. The linear position sensor has a stator with at least one excitation coil and at least one sensor receiver coil. Furthermore, the linear position sensor has at least one movable element which is linearly movable relative to the stator. The at least one movable element has a longitudinal extension extending in the direction of the linear direction of movement of the movable element. The at least one movable element is designed with several electrically conductive coupling sections for inductive coupling of the at least one excitation coil with the at least one sensor receiver coil. In addition, there is at least one movable element with non-coupling sections that are electrically less conductive than the coupling sections or electrically non-conductive. The coupling sections are distanced from each other by the non-coupling sections in the direction of the longitudinal extension. Furthermore, the linear position sensor has an evaluation circuit. The evaluation circuit is set up to detect a linear position of the at least one movable element relative to the stator as a function of the inductive coupling between the at least one excitation coil and the at least one sensor receiver coil.

The advantages of the inductive linear position sensor are in particular that the design of the cursor as a movable element enables inductive sensing of the linear position of the at least one movable element in relation to the stator in a simple manner. When used in a steering system, the linear position sensor eliminates the problem of ambiguity outlined above and the linear position sensor can be comparatively compact and still measure comparatively long linear travel in the range of up to 300 or 400 mm without difficulty. In particular, it may be provided that the inductive linear position sensor (hereinafter also referred to as the linear position sensor) is set up by means of the evaluation circuit to detect a linear travel by the at least one movable element relative to the stator when the at least one movable element moves in the linear direction of movement.

How the inductive measurement between a stator and a cursor functions is known to the skilled person in a fundamental way, for example from DE 10 2018 102 698 A1, which is incorporated herein by reference, as well as from the sensors sold by HELLA GmbH & Co. KGaA under the brand name CIPOS®.

The inductive linear position sensor according to the invention can be an incremental encoder as well as a sensor that enables an absolute detection of the linear position of the at least one movable element relative to the stator. By means of an incremental encoder, only a digital detection of the linear position of the at least one movable element relative to the stator is possible, which is also dependent on the history of the previously counted increments and thus cannot provide immediate absolute position information after a restart or after switching on the linear position sensor or higher-level system. By means of the evaluation circuit of the linear position sensor, not only the linear position of the at least one movable element relative to the stator, but also the linear travel by the at least one movable element and/or a relative velocity between the at least one movable element and the stator can be determined in a manner known to those skilled in the art. Furthermore, the evaluation circuit may include means of signal amplification and signal processing.

The inductive linear position sensor according to the first aspect of the invention can be used in various applications, in particular in vehicles or in various automotive and also in non-automotive or other applications. The linear position sensor can be used, for example, in a steering system of a vehicle. The application for a steering system is merely an exemplary but particularly advantageous field of application for which the linear position sensor is particularly suitable according to the first aspect of the invention and in which it can be used without being limited to it. Other favorable applications include the spring deflection of the chassis, shock absorbers or seat adjustment on the seat rail. In the non-automotive context, these are mainly X-Y adjustment devices on machines, in plant engineering and on production lines.

For an application of the linear position sensor, the stator and/or at least one movable element, advantageously the at least one movable element, is attached to a moving part. The moving part can also be perceived as part of the linear position sensor. In the exemplary application in the steering system, this can be a steering actuator rod in particular. The other of stator and at least one movable element, advantageously the stator, can be positioned on a not-moved or non-moving part in relation to which the moving part is moved or displaced linearly. As a result, a linear travel of the at least one movable element leads directly to an identical position movement of the linear position of the at least one movable element and the moving part against the not-moved part or stator. From the linear position or linear travel of the at least one movable element detected by the stator or the evaluation circuit, it is thus possible to draw direct or immediate conclusions about the linear position or linear travel of the moving part, which is to be detected in the context of the respective application with regard to its linear travel. In the example of the steering system, the linear travel of the steering actuator rod thus corresponds to a changed linear position of the movable element arranged on it, so that the linear travel can be detected by means of the linear position sensor in order to carry out a corresponding steering movement based on it.

The arrangement or attachment of the at least one movable element and/or stator to the moving and/or non-moving part can be carried out in various ways. For example, it is possible to screw, weld, inject and/or glue the respective components with each other or to each other. It is advantageous to choose a fastening method that is as non-destructive as possible so as not to interfere with the application, but at the same time is suitable for ensuring secure fastening so that the fastening or fixed position of the at least one movable element and/or stator is not lost, which could otherwise lead to measurement errors. Accordingly, it may be provided that the at least one movable element and/or the stator is set up for the appropriate attachment to the moving part and/or non-moving part. For example, at least one movable element and/or the stator may have corresponding mounting holes, adhesive surfaces or the like.

In particular, the stator may be designed as a printed circuit board with the at least one excitation coil and at least one sensor receiver coil arranged on it. The stator or printed circuit board can also comprise the evaluation circuit.

The coupling sections can alternate linearly cyclically with the non-coupling sections in the extension of the at least one movable element. The coupling sections can be made of a metallic material. In particular, the coupling sections can be made of an electrically conductive solid material. As a result, the at least one movable element, and thus the linear position sensor, is very robust and therefore also suitable for particularly adverse environmental conditions. Also, the electrically conductive material of the coupling sections can be formed as a preferably non-ferromagnetic material, such as copper, aluminum, stainless steel or the like. As a result, the coupling sections are particularly suitable for use under corrosive environmental conditions.

The non-coupling sections, on the other hand, may be made of a non-metallic material, in particular an electrically insulating material or insulator. For example, the non-coupling sections can be made of a plastic. This ensures that the non-coupling sections do not distort the measurement results of the linear position sensor. In a preferred design, which will be explained in more detail later, the non-coupling section can be formed by a free space or air space between the coupling sections.

In principle, it is sufficient if the linear position sensor is designed with only one movable element. The movable element forms a track with inductive coupling sections and the non-coupling sections to which at least one sensor receiver coil of the stator is assigned.

An advantageous further development of the linear position sensor is that the stator has at least two sensor receiver coils. The linear position sensor can have at least two movable elements which are linearly movable relative to the stator and, for example, are arranged parallel or transversely to each other. The coupling sections of the two movable elements may be offset from each other in the direction of the longitudinal extension of the at least one movable element. Each of the movable elements can be assigned a sensor receiver coil of the stator. In particular, in each case a sensor receiver coil assigned to a movable element may be opposite the respective movable element. In this way, an inductive coupling of the excitation coil can be achieved with different sensor receiver coils, each of which is assigned to different movable elements. Further, it is possible to use more than two sensor receiver coils and more than two movable elements. As a result, the inductive linear position detection can be further improved by the linear position sensor.

Orienting two movable elements in parallel in one plane has the advantage of achieving sufficient decoupling of the two tracks and simply being able to implement the stator as a single printed circuit board (PCB for short). However, the movable elements are usually to be moved along the stator via a guide. In order to make the movable element mechanically stable with minimal use of material, designs are advantageous in which the movable element is not designed in one plane, but rather manufactured as a curved part. Thus, production as a stamped and bent part is of great advantage. Various variants are conceivable, starting with a simple "V"-shaped design with a first movable element on the left side of the "V" and a second movable element on the right side of the "V". The disadvantage of such a simple bending is that in this case two circuit boards must be inserted for the left and right parts of the "V", respectively. An advantage with such a simple bending, but in a figurative sense also in other embodiments, can be a certain preload of the stamped and bent part. In any case, the stamped and bent part must be moved linearly past the stator as a movable element, which can be achieved by a corresponding guide in a stator housing. With the task of guiding the movable element as backlash-free and with low tolerances as possible, a preload of the two legs of the "V" in combination with the "V"-shaped guide in the stator can be advantageous. Depending on the further design of the guide, the shape of the guide does not have to correspond to that of a "V", but can, for example, correspond to that of a dovetail guide or be partially trapezoidal or "U"-shaped from the cut. A particularly advantageous profiling of a U-profile, in which the two movable elements are located on the legs of the "U", should be emphasized. In this case, a single multilayer PCB can be inserted into the "U" especially advantageously. The multilayer PCB can be designed to inductively detect the first movable element in the left leg of the "U" by means of first transmitter and receiver coils on first layers of the PCB and to detect the second movable element of the right leg of the "U" by means of second transmitter and receiver coils on second layers of the PCB. In other words, and in the conception of the circuit board placed upright in a U, part of the layers measures to the left and another part of the layers to the right. In this case, at least two layers can be assumed and, due to the usual unbundling problem and the design of vias, at least four layers. In addition, there may be further layers in the middle of the layer structure of the circuit board, in which shielding structures are realized that can help to suppress crosstalk of the inductive signals of the two movable elements and the transmitter and receiver coils used for this purpose.

It may also be provided that the at least two movable elements each have a different number of coupling sections. In addition, the evaluation circuit for the evaluation of the linear travel can be set up on the basis of the at least two movable elements and at least two sensor receiver coils in the manner of the vernier principle. This enables inductive detection of the linear position of the moving part on which the movable elements can be attached together relative to the stator at any time and with high precision. This capability is also referred to as "True Power On", according to which position detection is also possible immediately after the linear position sensor has been switched on, i.e., after it has been transferred to its operating state. Accordingly, indexing or the like is not required for the linear position sensor according to the present embodiment.

Designed according to the vernier principle, it is also possible to speak of two different measuring paths or tracks, which are provided by the at least two movable elements. In principle, the movable elements can be arranged next to each other or on top of each other. In principle, the cursors can have a length in the range of, for example, 2 to 10 cm, especially in the range of, for example, 3 to 5 cm. In the manner of the vernier principle, the relative displacement or movement of the movable element formed from the cursor or the moving part attached to it, even a much greater length of 30 cm or more, can be measured simply and precisely by means of the evaluation circuit.

The vernier principle distinguishes between a vernier primary track and a vernier secondary track. First of all, with regard to the vernier primary track, the vernier method basically works in such a way that a first coupling section is moved as an element of the first movable element above the stator coils (receiver coils and transmitter coils) associated with the vernier primary track. As the movement of the coupling section progresses, a linear increase in the sensor output signal occurs. The coupling section mentioned above is part of a network of other coupling sections, which are combined to form the so-called movable element. Widths of the coupling sections and distances between the coupling sections are selected in such a way that if a coupling section of the movable element runs out of the detection field of the stator, the next coupling section already runs in. In detail, the principle can usually be improved by using not only two coupling sections, but three or more coupling sections in the movable element, since then one coupling section is always running in, one coupling section is fully detected or is fully in the detection field and a third coupling section is running out at any point in time. This creates a triangle signal as an output signal.

Now the second vernier track or the second sensor receiver coil with the second movable element comes into play, which generates a locally phase-shifted triangle signal of different lengths. Both vernier tracks or movable elements with the sensor receiver coils assigned to it can be calculated by means of a vernier algorithm in the evaluation device. In this way, a linear position sensor is provided that is unambiguous due to the different lengths of the movable elements and the localized phase relationship on the desired measuring path of ten cm or more. For example, the provision of two parallel movable elements and two sensor receiver coils, each of which forms a vernier track, results in a linear position sensor that is attractive and extremely compact in terms of cost. On the other hand, well-known linear position sensors often have the problem that the quotient of installation space length and measuring path is very large, which is disadvantageous.

Furthermore, it may be provided that the at least two movable elements arranged parallel to each other are arranged next to each other and in a common plane. The design of the movable elements next to each other enables a particularly compact linear position sensor. The arrangement of the movable elements in a common plane enables particularly simple production, for example as a stamped part, as will be explained in more detail later. An even more decisive advantage of this planar design is that both vernier structures of the stator can be realized on a single PCB at low overall cost. In particular, the two movable elements in the arrangement in the common plane can share one or opposite surfaces with each other. Furthermore, the movable elements can be single-piece or monolithic with each other.

It may also be provided that the at least two movable elements located parallel to each other are connected to each other by a connecting bar running between the coupling sections of the respective movable elements. The connecting bar allows for a structurally simple linking of the two movable elements or their respective coupling sections with each other without impairing the measurement results of the linear position sensor.

In addition, it may be provided that the at least one movable element is designed as a flat piece extending in the direction of its longitudinal extension in a plane. Designed as a flat piece, the at least one movable element is particularly compact. In the case of a one-piece design with several movable elements together, all movable elements can be formed together by the flat piece. A flat piece is an essentially flat or plate-shaped part. The flat piece may have an essentially rectangular geometry. The opposite surfaces of a flat piece, which are the largest in terms of area of the flat piece, can be flat and parallel to each other.

It may also be provided that the coupling sections are designed as elevations in relation to the non-coupling sections. This is a simple way for the sensor receiver coils to be brought close to the coupling sections for precise sensing. The non-coupling sections, on the other hand, can have a greater distance to the at least one sensor receiver coil than the coupling sections. This prevents the non-coupling sections from being inductively coupled to the at least one sensor receiver coil.

In addition, it may be provided that the non-coupling sections are designed as recesses between the coupling sections of the at least one movable element. This is a particularly simple way to provide the non-coupling sections to avoid inductive coupling of these sections to the at least one sensor receiver coil. Due to the recesses, there is only air or an air space between the coupling sections, which separates the coupling sections from each other and prevents undesirable measurement influences. The recesses can advantageously be made very simply, for example by punching out the non-coupling sections from a solid material, for example a metallic stamped part or flat piece. This ensures particularly low manufacturing costs for the linear position sensor.

Furthermore, it may be provided that the at least one movable element is a metallic stamped part. For example, the metallic stamped part can be provided as a roll or coil made of metal, such as stainless steel, and be stamped by unwinding the rolled metal to create the movable element. This makes it particularly easy to manufacture the movable element.

It may also be provided that the at least one movable element has an electrically non-conductive carrier and that the coupling sections are applied to the carrier. For example, the carrier can be made of a plastic material, especially injection molded. The carrier, which can alternatively also be referred to as the core, enables, among other things, a particularly simple subsequent attachment of the at least one movable element to the moving or non-moving part. The coupling sections may, for example, be applied to the substrate as isolated electrically conductive plates, in particular metal plates, or electrically conductive coatings, in particular metal coatings, for example by gluing or by another process, such as immersion in a liquid metal bath or, secondly, by metallic vapor deposition or sputtering. The coupling sections can also be produced using a sintering process. This has the advantage that the manufacturing tolerances caused by the process are further restricted and can thus be optimally designed for the sensor technology. Accordingly, the at least one movable element does not have to be completely made of an electrically conductive material. It is sufficient if only the coating or plates arranged on the core or the carrier are electrically conductive, which reduces the manufacturing costs of the linear position sensor.

According to a second aspect of the invention, the object mentioned above is achieved by a steering system for a vehicle, wherein the steering system comprises the linear position sensor according to the first aspect of the invention.

The vehicle's steering system may have familiar components such as steering elements, for example a steering wheel, a vehicle axle, etc.

It may be provided that the at least one movable element is located on a steering actuator rod of the steering system. The linear position sensor, on the other hand, can be arranged accordingly with its stator on or at an immovable or non-moving part, such as a housing of the steering system. This advantageous arrangement allows for a positioning secured against possible slipping for measurement by means of the linear position sensor in the steering system.

In addition, it may be provided that the steering system is designed as a steer-by-wire system with a control unit and an electromechanical actuator. The control unit can be coupled with the linear position sensor. The control unit may be set up to convert the linear position detected by the linear position sensor into a steering command for the electromechanical actuator and transmit it to the electromechanical actuator so that the electromechanical actuator can perform a controlled steering movement corresponding to the steering command.

The electromechanical actuator can be, for example, an electric motor or any other type of actuator that can perform the steering movement on the vehicle.

The linear position sensor may be at least partially located in or on a housing of a power unit of the steering system that has at least the electromechanical actuator. Such power units are often referred to as power packs and also include the control unit of the steer-by-wire system.

According to a third aspect of the invention, the object mentioned above is achieved by a vehicle, in particular a motor vehicle, such as a car or truck, having a steering system according to the second aspect of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Identical, functionally identical or structurally identical elements are designated with the same reference signs in FIGS. 1 to 6. If an identical, functionally identical or structurally identical element is present several times in the same figure, it is designated by the same reference sign, wherein it is numbered sequentially only to distinguish the elements from each other. The number and arrangement of identical, functionally identical or structurally identical elements in the sense of the invention is thus by no means limited, but, unless otherwise specified, is merely given by way of example. The sequential numbering is separated from the reference sign by a period.

Figure 1:
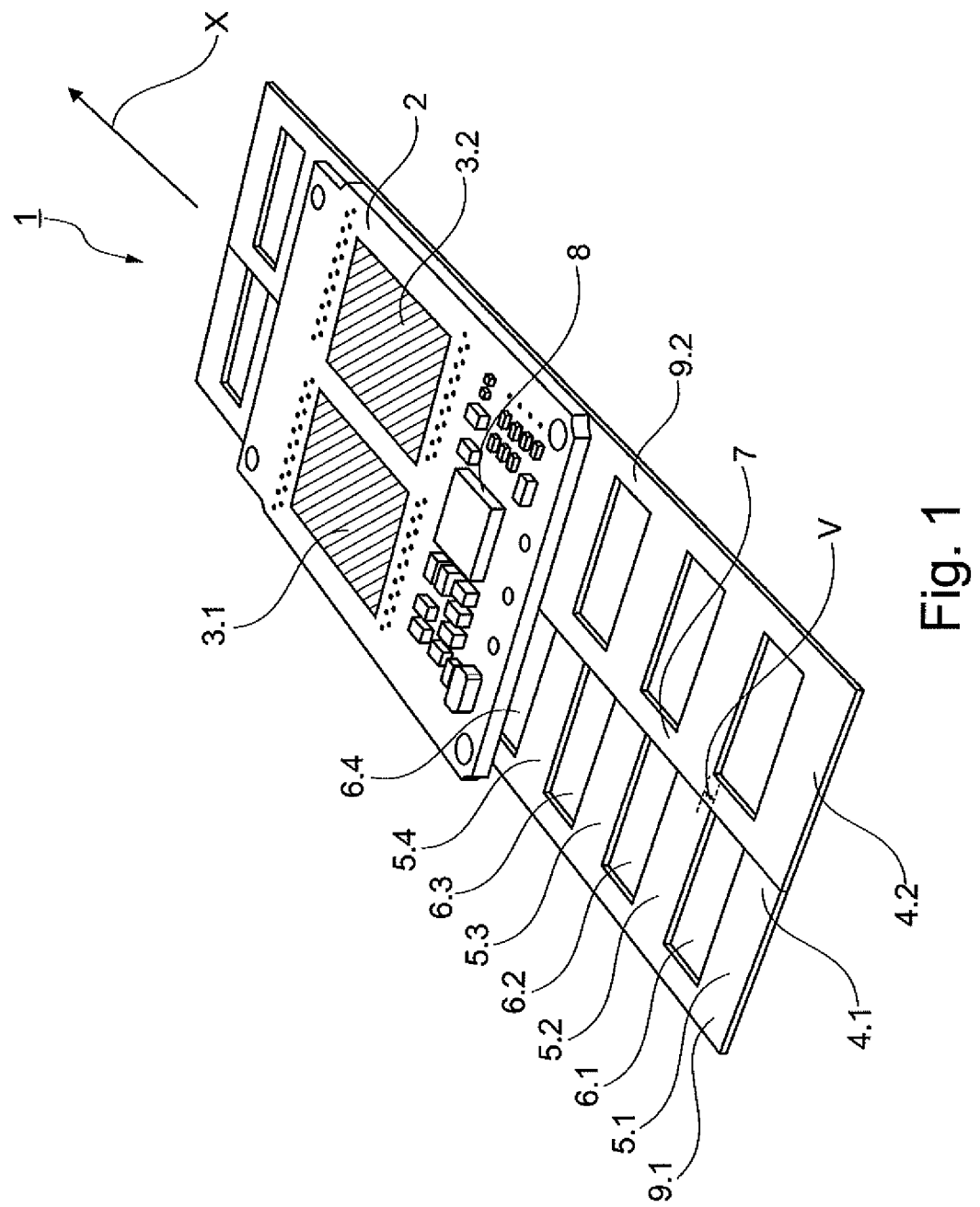
FIG. 1 shows a perspective view of an inductive linear position sensor.

FIG. 1 shows an inductive linear position sensor 1 in a perspective view. The inductive linear position sensor 1 has a stator 2 and a so-called cursor. The linear position sensor 1 is designed to determine the linear position and/or the linear travel of the cursor traveled in a direction of movement X with the movable elements 4.1, 4.2 relative to a stator 2.

The movable elements 4.1, 4.2, which can alternatively also be referred to as cursor bands 4.1, 4.2, can generally be more or less solid. For example, more or less electrically conductive sections used here can be realized by, for example, machining a solid movable element 4.1, 4.2. However, it can also be advantageous to produce the movable elements 4.1, 4.2 from a metal strip by means of punching. Following this idea, the movable elements 4.1, 4.2 are hereinafter referred to as cursor bands 4.1, 4.2, although this is always intended to refer to a more general design of the movable elements 4.1, 4.2. Therefore, the term "cursor band" does not imply that it has to be a physical band. Rather, the term "cursor band" is to be understood primarily with regard to the electrical effects, since the electrical effects take place in the surface of the movable elements 4.1, 4.2 and the three-dimensional design of the movable elements 4.1, 4.2 is not necessary for the measuring principle itself, but rather from a manufacturing point of view or necessary mechanical stability criteria.

Figure 5:
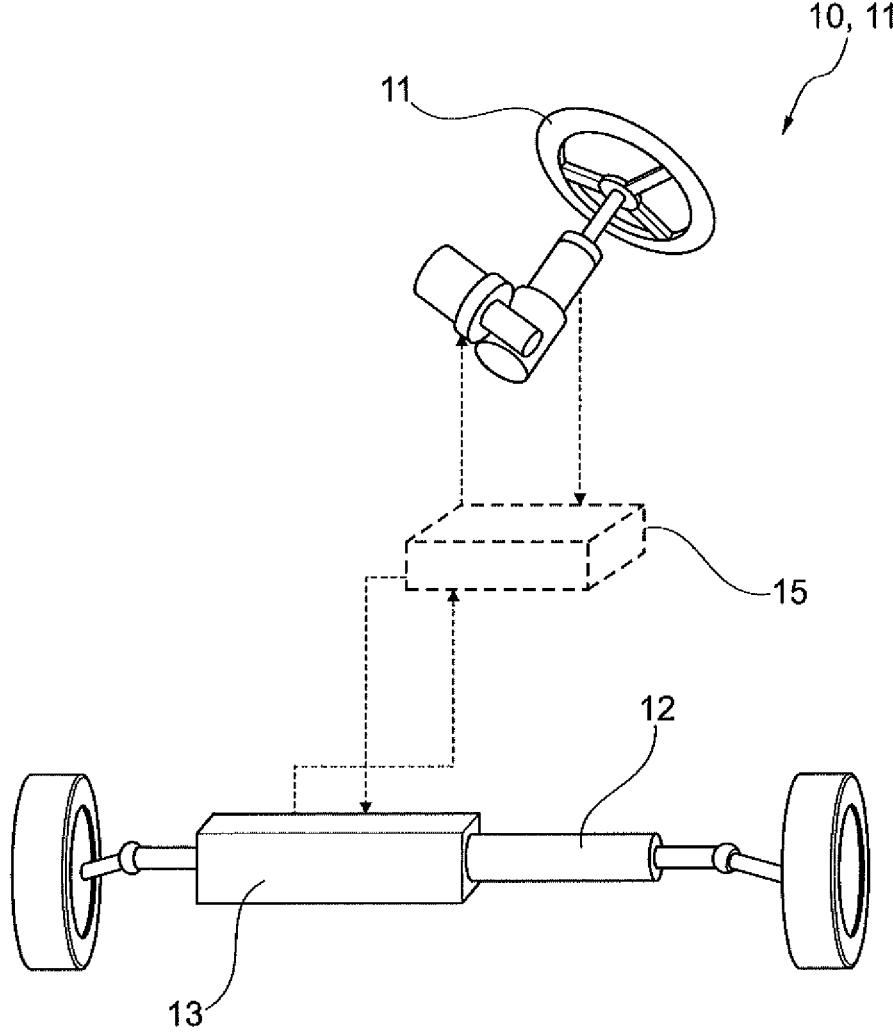
FIG. 5 shows a principle view of a vehicle's steering system.

The cursor, in particular attached to a moving part, such as a steering actuator rod 12 (see FIGS. 5 and 6), and the stator 2 may be installed in a vehicle 100 (see FIG. 5). The stator 2 has an excitation coil not shown and two sensor receiver coil sets 3.1, 3.2, which are arranged in the manner known to those skilled in the art on the stator 2, which is formed in the present case by a printed circuit board. The sensor receiver coil sets 3.1, 3.2 formed of several single receiver coils, as in the technology known with the brand name CIPOS®. In the case of CIPOS® technology, three single receiver coils are always used here. Other solutions using two single receiver coils are also known, although the number of single receiver coils can be increased beyond three to improve accuracy. The two sensor receiver coil sets 3.1, 3.2 are each assigned to one of the cursor bands 4.1, 4.2 or arranged parallel to it.

In this case, the cursor is formed by the two cursor bands 4.1, 4.2. Cursor bands 4.1, 4.2 are arranged parallel to each other and next to each other. Furthermore, the two cursor bands 4.1, 4.2 share a common plane or extend in a common plane. The cursor bands 4.1, 4.2 are connected to each other by a connecting bar 7 of the coupling sections 5.1, 5.2, 5.3, 5.4, which, analogous to the above explanation for the designation of the movable elements 4.1, 4.2 are referred to as cursor bands 4.1, 4.2, hereinafter referred to as cursor pads 5.1, 5.2, 5.3, 5.4, which connects the cursor bands 4.1, 4.2 to each other respectively (only some of the cursor pads 5 of the cursor bands 4.1, 4.2 are referred to here for the sake of clarity). The cursor bands 4.1, 4.2 have a longitudinal extension, along which the connecting bar 7 also extends.

The cursor pads 5 adjacent to each other transversely to the longitudinal extension of the cursor bands 4.1, 4.2 are arranged in the present case with an offset V to each other. In other words, the cursor pads 5 of the respective cursor bands 4.1, 4.2 each start at different lengths or positions of the connecting bar 7 viewed in its extension. In addition, cursor band 4.2 has fewer cursor pads 5 than cursor band 4.1, in this case, for example, ten cursor pads 5 for cursor band 4.2 and eleven cursor pads 5 for cursor band 4.1.

The cursor pads 5 are made of an electrically conductive material, in particular a metallic material. They serve as inductive coupling sections for the stator 2 with its sensor receiver coil sets 3.1, 3.2. Between the cursor pads 5 there are non-coupling sections 6.1, 6.2, 6.3, 6.4, wherein for the sake of clarity only some of the non-coupling sections 6 of the cursor bands 4.1, 4.1 are designated.

The non-coupling regions 6 may be formed by a material less than the cursor pads 5 or a non-electrically conductive material. In particular, they can be formed by an insulator between the cursor pads 5. In the present case, the non-coupling sections 6 are formed as recesses or cavities in the cursor bands 4.1, 4.2 between two cursor pads 5 of each cursor band 4.1, 4.2. This is a particularly preferred embodiment of the non-coupling sections 6, because the cursor can be manufactured easily and cost-effectively and good measurement results can be achieved.

The shown cursor bands 4.1, 4.2, or the cursor of FIG. 1, is designed here as an example as a flat piece in the form of a metallic stamped part. This has advantages in manufacturing, as a roll or coil of the metallic material of the cursor can be unwound and cut to fit to obtain the cursor. The non-coupling sections 6 can then be prepared by applying or introducing an insulator, or as shown here, by punching out.

Alternatively, it is also possible, for example, to manufacture the cursor with a carrier or core made of, for example, plastic. The carrier or core can be produced cost-effectively in an injection molding process. The cursor pads 5 can then be used in the arrangement shown in FIG. 1 by gluing or otherwise applying them between the plastic, the areas of which then serve as non-coupling sections 6.

In the present case, the cursor pads 5 and non-coupling sections 6 are rectangular in shape. Although this is easy to implement in terms of manufacturing technology, it is not necessary for the function in cursor bands 4.1, 4.2. Alternatively, it is possible, for example, to form the cursor pads 5 and/or non-coupling sections 6 with a rectangular shape with rounded corners, an elliptical shape, or other shape.

Figure 2:
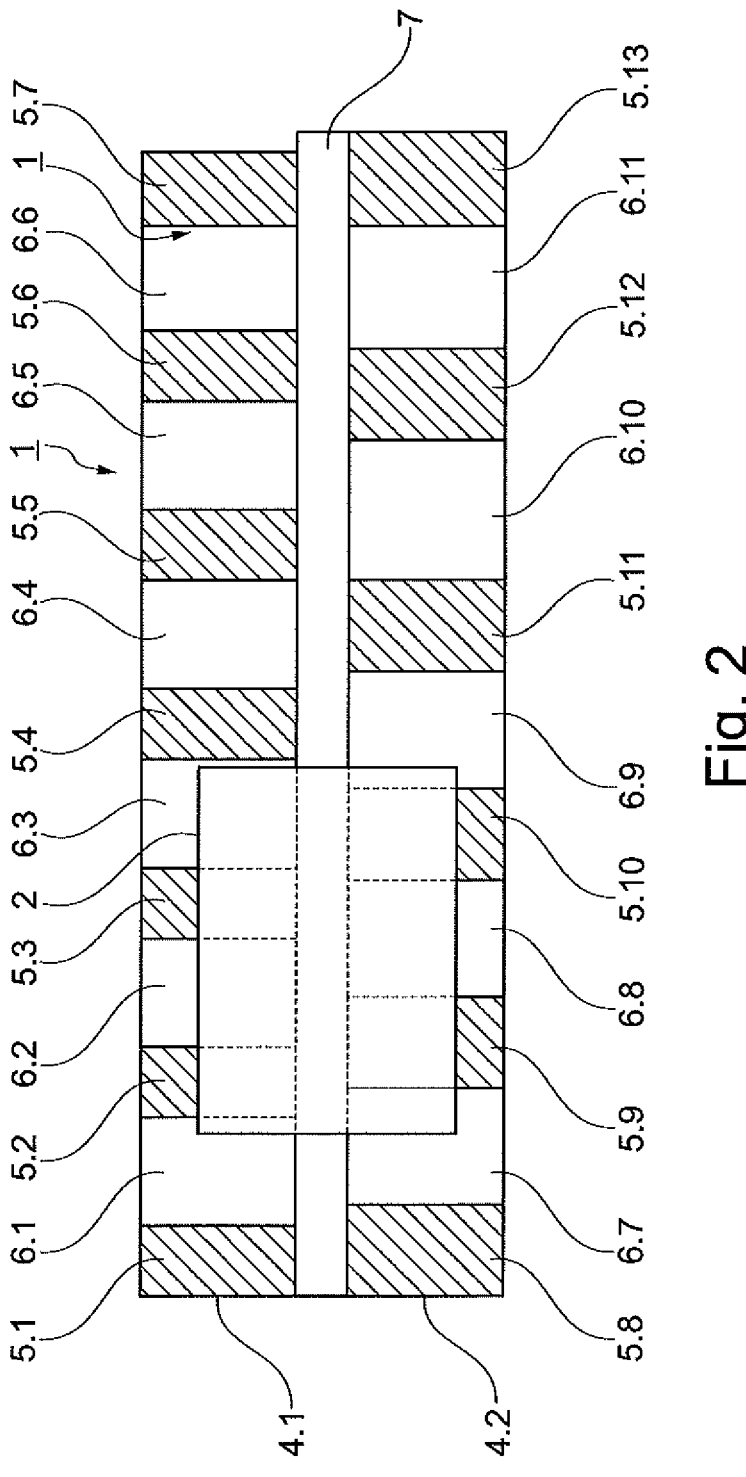
FIG. 2 shows a top view of the inductive linear position sensor.

The cursor bands 4.1, 4.2 also have transport bars 9.1, 9.2 or transport strips on their outer sides, connecting the cursor pads 5 in each case. These are purely optional and can be omitted. However, in the method described above of producing the cursor as a stamped part, they are advantageous for transporting the cursor or cursor bands 4.1, 4.2. In the final method step, however, they can be removed. Such a cursor or cursor bands 4.1, 4.2 are shown in FIG. 2, which will be discussed in more detail later.

At a distance from the cursor bands 4.1, 4.2 and parallel to them is the stator 2 with its sensor receiver coil sets 3.1, 3.2. Furthermore, the stator 2 has at least one excitation coil. In addition, the stator has an evaluation circuit 8. The evaluation circuit 8 is set up to determine the relative position of the cursor or the moving part, such as the steering actuator rod 12 from FIG. 6, or a linear travel relative to the stator 2 as a function of the inductive coupling between the excitation coil and the two sensor receiver coils of the stator 2 by means of the cursor in an operating state of the inductive linear position sensor 1 according to the present embodiment, i.e., when the inductive linear position sensor 1 is switched on. From the linear position of the moving part relative to the stator 2 determined in this way, the linear position, the linear travel and/or the linear velocity of the moving part relative to the stator 2 can then be determined in the manner known to the skilled person by means of the evaluation circuit 8.

Depending on the linear position of the moving part or the cursor relative to the stator 2, one or more cursor pads 5 of the cursor bands 4.1, 4.2 come into active connection with the excitation coil and the sensor receiver coil sets 3.1, 3.2 of the stator 2. The non-coupling sections 6 between the cursor pads 5 are essentially not in active connection with the excitation coil and the sensor receiver coil sets 3.1, 3.2 of the stator 2. The cursor pads 5 thus each establish an inductive coupling of the excitation coil with the sensor receiver coil sets 3.1, 3.2 of the stator 2, which provides a unique combination of output signals of the sensor receiver coil sets 3.1, 3.2, as can be seen in FIG. 4.

Figure 4:
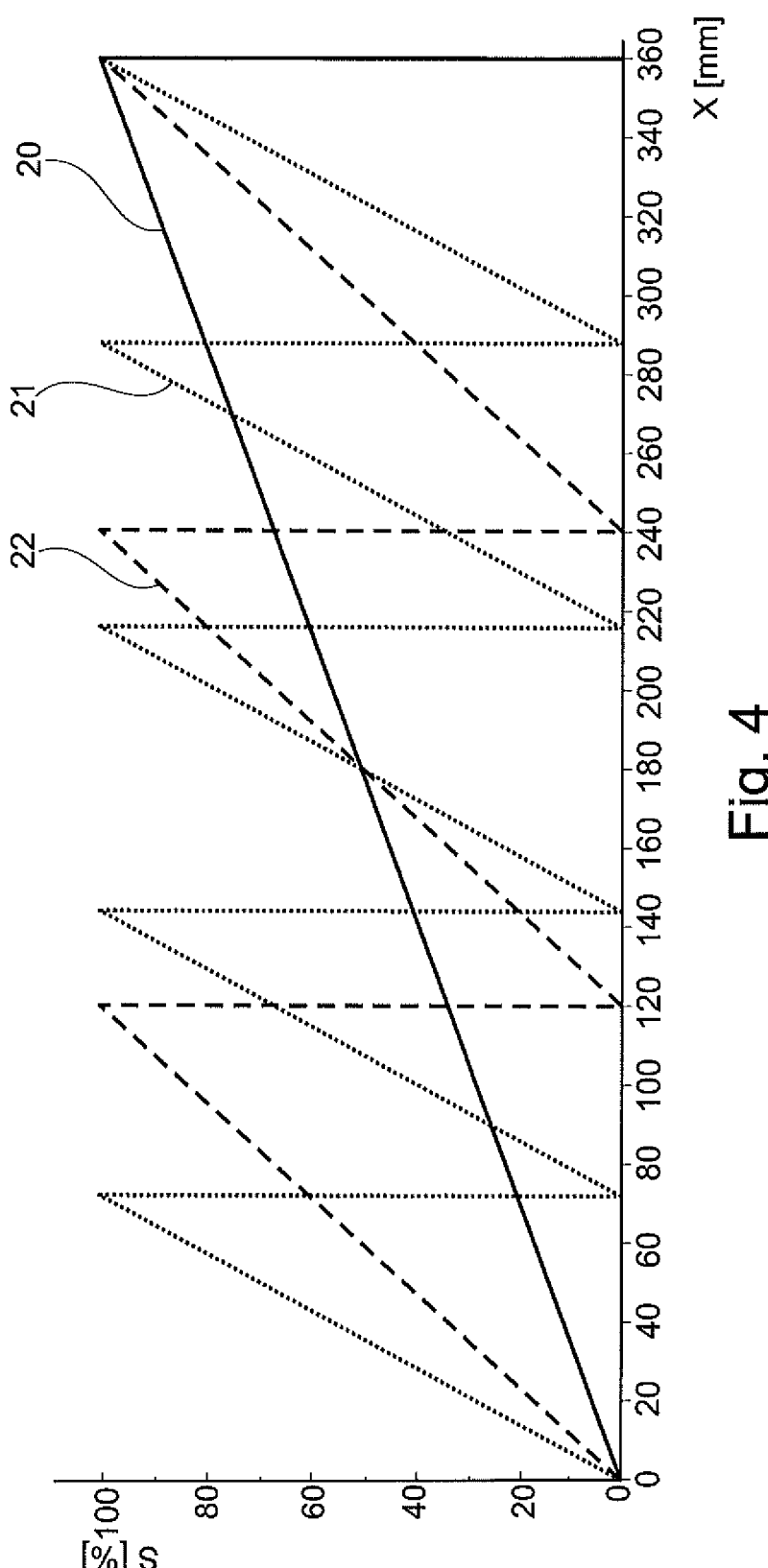
FIG. 4 shows a view of a signal-linear position diagram of the sensor receiver coils in the inductive linear position sensor of FIGS. 1 and 2.

FIG. 4 shows the signal strength S in % of the output signals 21, 22 of the sensor receiver coil sets 3.1, 3.2 generated as triangle signals over the traveled linear travel X in the direction of movement X. These output signals 21, 22 are forwarded to the evaluation circuit 8 for evaluation. From the evaluation circuit 8, the output signals 21, 22 of the sensor receiver coil sets 3.1, 3.2 are combined to form a resulting signal 20, which results in the linear travel X.

The cursor bands 4.1, 4.2 form different vernier tracks with a different number of cursor pads 5 with corresponding non-coupling sections 6, wherein the cursor pads 5 and non-coupling sections 6 of the two cursor bands 4.1, 4.2 are formed and arranged in relation to each other in such a way that an evaluation of the relative position of the moving part to the stator 2 is possible by means of the evaluation circuit 8 according to the vernier principle.

Figure 6:
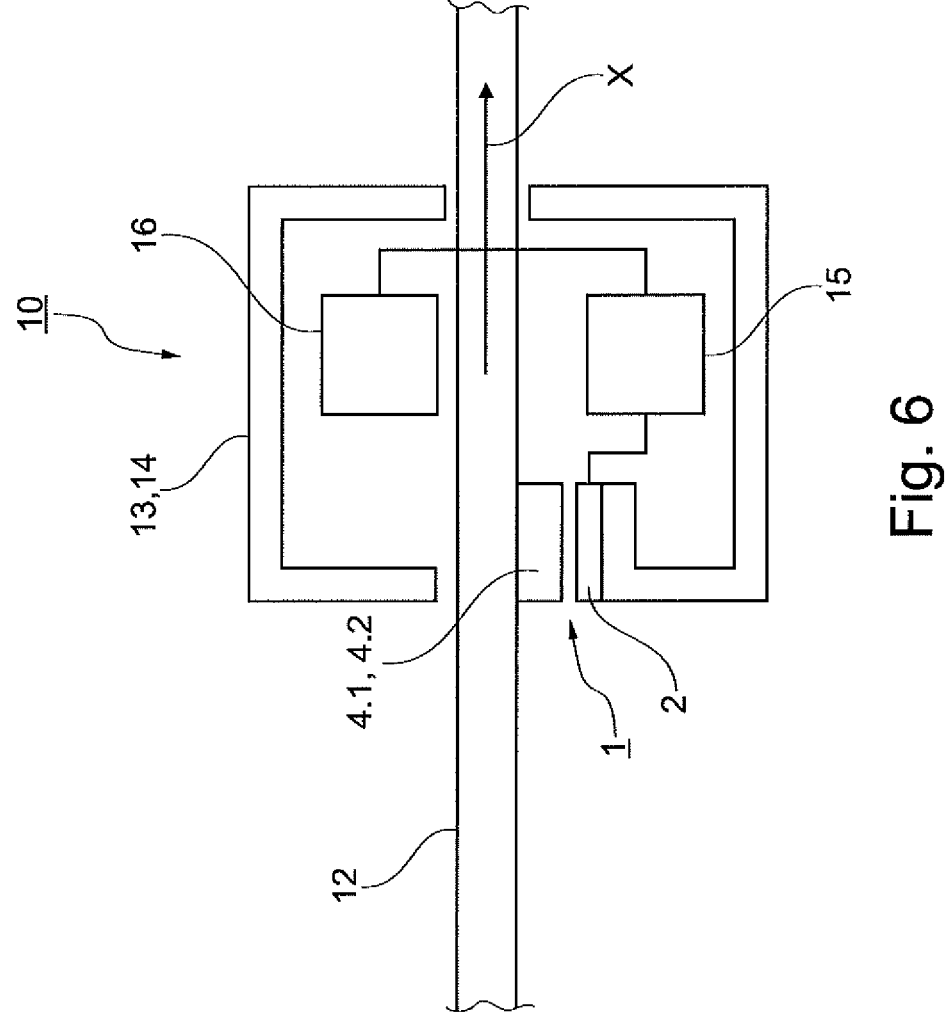
FIG. 6 shows a principle view of a power unit of the steering system from FIG. 5.

Now, in various automotive applications, especially with a steering system 10 in the vehicle 100, as shown in FIGS. 5 and 6, the cursor can be attached, for example, glued or screwed on, to a moving part of the application, such as a steering actuator rod. The stator 2, in turn, can be attached to an immovable or non-moving part. If the moving part is moved, the cursor also moves past the stator 2. The at least one excitation coil provides excitation or eddy current generation in the cursor pads 5 in a manner known to those skilled in the art, which in turn are detected by the sensor receiver coil sets 3.1, 3.2. As a result, the evaluation circuit 8 can measure a linear travel of the movement of the cursor in the direction of movement X or a linear position, i.e., a position in the linear direction of movement X, of the cursor in relation to the stator 2 according to the vernier principle with the cursor bands 4.1, 4.2 and the cursor pads 5, which are offset to each other and differ in number. From this, the linear position or linear travel of the moving part, i.e., the steering actuator rod 12, can be deduced.

FIG. 2 shows the already mentioned alternative embodiment of a cursor with two cursor bands 4.1, 4.2 without the transport bars 9.1, 9.2 from FIG. 1 and in a smaller number of cursor pads 5 and non-coupling sections 6 than in FIG. 1.

In principle, the number of cursor pads 5 and non-coupling sections 6 can be freely selected according to the respective application, in particular the linear travel to be measured. For example, the number of cursor pads 5 can range from 3 to 30, specifically from 5 to 20. Similarly, the number of non-coupling sections 6 can range from 2 to 29, specifically between 4 and 19.

Figure 3:
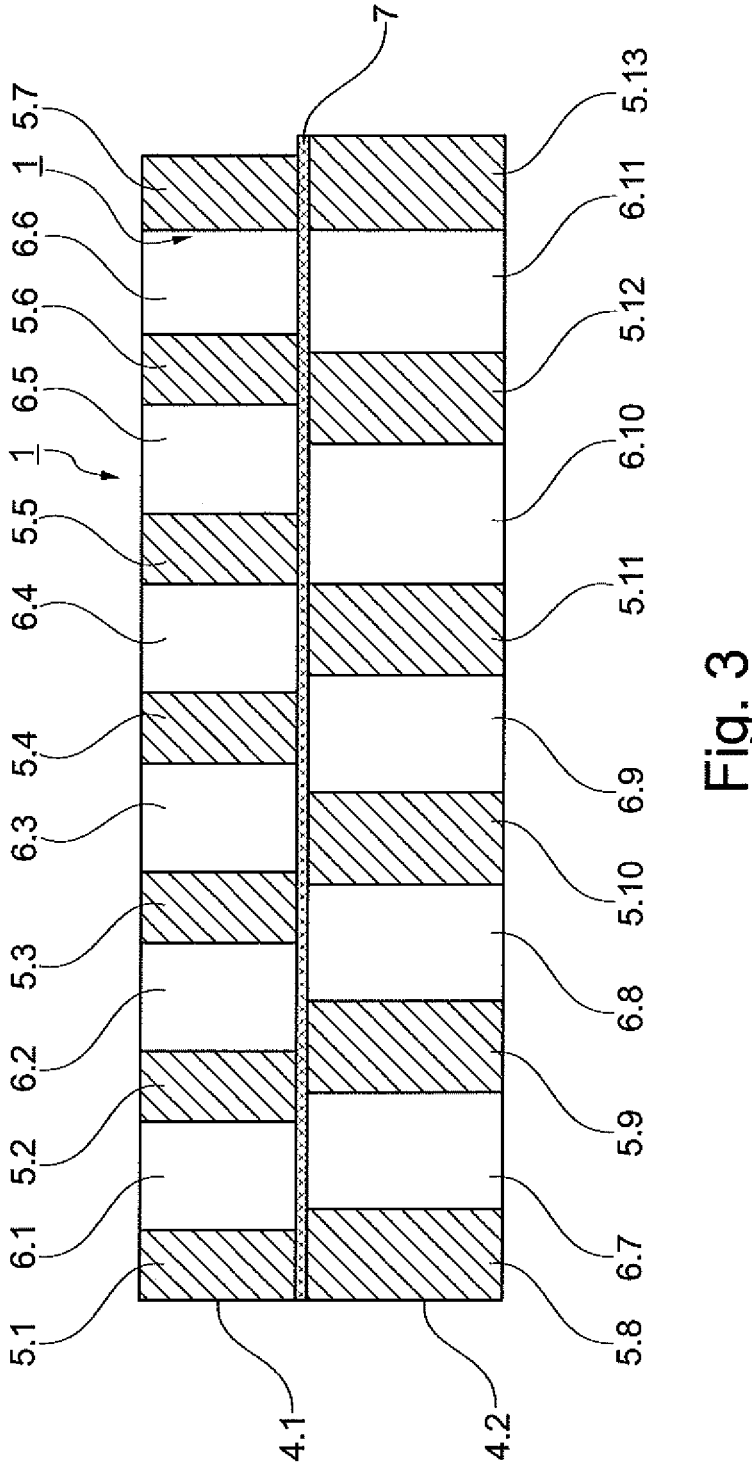
FIG. 3 shows a plan view of an alternative embodiment of a cursor of the inductive linear position sensor from FIGS. 1 and 2.

FIG. 3 shows another alternative embodiment of a cursor that differs from FIG. 2 by the fact that the connecting bar 7 is not made of metal, but of a non-metallic material, for example plastic. The connecting bar 7 thus forms a non-coupling section. The cursor pads 5 can be applied directly to the moving part, such as the steering actuator rod 12, at a suitable distance from each other.

FIG. 5 shows a steering system 10 of a vehicle 100 in the form of an automobile, which is designed as a steer-by-wire system.

In so-called steer-by-wire systems, in which the steering column is omitted, the system is specified firstly by a human-machine interface and secondly by a positioning device on the wheels of the vehicle 100. The first unit is located in the vehicle interior and preferably includes a steering wheel with steering angle sensors and a reset device. The second positioning device is connected to the preferably two front wheels and is formed by a position control loop with a setpoint and an actual value. As is usual in a position control loop, the control is carried out in digital form by means of a position control algorithm in a microprocessor or other digital control or a hardwired algorithm in a so-called state machine. In principle, however, analog controls or analog/digital-hybrid controls are also conceivable for the control task.

In order to be able to carry out the control precisely, the position sensor is of great importance. In principle, angle sensors or linear position sensors can be considered as position sensors. The embodiment selected here represents the linear position sensor 1 from FIG. 1 on the steering actuator rod 12 of the steering system 10 (see FIG. 6).

The steering system 10 comprises a steering element 11, which is designed as a steering wheel in the present case. The driver of the vehicle 100 wants to steer the vehicle 100 by means of the steering element 11 and turns the steering wheel in a certain direction by a certain steering angle. This steering angle and steering torque is recorded by a sensor system installed on the steering wheel. To be precise, a control unit 15 (also referred to as an electronic control unit, ECU for short) of the steering system 10 is electronically connected to the corresponding sensor system and receives the driver's steering request (steering angle and steering torque) and in turn transmits it to a power unit 13 connected to the control unit 15, which is often also referred to as a power pack.

The steering is based on a position control loop with a setpoint and an actual value. By means of the inductive linear position sensor 1 in the power unit 13 (see FIG. 6), the actual position of the wheels of the vehicle 100 can be determined. The steering actuator 16 (see FIG. 6), also in the power unit 13, is then controlled by the control unit 15 in order to operate the steering according to the driver's wishes. This is done by moving the steering actuator rod 12 linearly to the right or left and thus also moving the wheels of the vehicle 100 accordingly. This is done until the linear position sensor 1 informs the control unit 15 that the target position specified by the control unit 15 according to the driver's steering wheel operation has been reached.

FIG. 6 shows a more detailed schematic diagram of the steering system 10, which also shows the components of the power unit 13. The linear position sensor 1 is located with the stator 2 on a housing 14 of the power unit 13, wherein the cursor bands 4.1, 4.2 are attached to the steering actuator rod 12 and are arranged in a movable manner relative to the stator 2. For example, the housing 14 may contain a recess or pocket in which the stator 2 may be embedded.

The integration of the linear position sensor 1 into the power unit 13 eliminates the otherwise necessary and costly cabling since those existing in the power unit 13 can be used or advantageously expanded. In addition, the interfaces and the supply lines of the electronics on the stator 2 of the linear position sensor 1 do not need to be protected against short circuits of the supply lines and output lines of the linear position sensor 1. This usually allows for simplified electronics and a simpler and more cost-effective manufacturing process for the semiconductor technologies used. Due to a more compact design of this embodiment, the overall arrangement is also less sensitive to electromagnetic radiation from interference fields, which increases the operational robustness of the sensors.

The operating principle of the steering unit 10, as described above, is such that the control unit 15 of the steering system 10 within the steering unit 10 receives the driver's steering request when the driver of vehicle 100 operates the steering element 11. The control unit 15 can then actuate the electromechanical actuator or steering actuator 16 to control the steering of the vehicle 100 by means of the linear position or linear travel of the steering actuator rod 12, which it obtains or can calculate from the measurements of the linear position sensor 12, in accordance with the steering request expressed by the driver by actuating the steering element 11.

The actuator 16 is actuated until the target position is reached according to the driver's steering request. This is the case if the control difference E=actual position−target position is equal to zero. The actual position, in turn, is determined by the measurements of the linear position sensor 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An inductive linear position sensor comprising:
a stator having at least one excitation coil and at least two sensor receiver coils;
at least two movable elements that are linearly movable relative to the stator and that each have a longitudinal extension extending in a direction of a linear direction of movement, the at least two movable elements each being formed with at least two electrically conductive coupling sections for inductive coupling of the at least one excitation coil with a respective one of the at least two sensor receiver coils as well as non-coupling sections that are electrically less conductive or non-conductive with respect to the coupling sections, the coupling sections being each spaced apart by the non-coupling sections in the direction of the longitudinal extension; and
an evaluation circuit to detect a linear position of the at least two movable elements relative to the stator as a function of the inductive coupling between the at least one excitation coil and the at least two sensor receiver coils,
wherein the at least two movable elements are arranged parallel to each other, wherein, with respect to the direction of the longitudinal extension of the at least two movable elements, the coupling sections and non-coupling sections of a first movable element of the at least two movable elements are arranged offset from the coupling sections and non-coupling sections of a second movable element of the at least two movable elements, wherein the at least two movable elements arranged parallel to each other are arranged side by side and in a common plane,
wherein the at least two movable elements arranged parallel to each other are connected to each other by a connecting bar that is separate from the at least two movable elements and runs between the coupling sections of the respective movable elements,
wherein the connecting bar is formed of a non-metallic material, and
wherein the connecting bar is arranged in the common plane.

2. The linear position sensor according to claim 1, wherein the first movable element has a different number of coupling sections than the second movable element, and the evaluation circuit for evaluating a linear travel of the at least two movable elements is set up on the basis of the coupling sections and the at least two sensor receiver coils according to the vernier principle.

3. The linear position sensor according to claim 1, wherein the at least two movable elements are each designed as a flat piece extending in the direction of the longitudinal extension in a plane.

4. The linear position sensor according to claim 1, wherein the coupling sections are designed as elevations relative to the non-coupling sections.

5. The linear position sensor according to claim 1, wherein the non-coupling sections are formed as recesses between the coupling sections of each of the at least two movable elements.

6. The linear position sensor according to claim 1, wherein each of the at least two movable elements are a metallic stamped part.

7. The linear position sensor according to claim 1, wherein each of the at least two movable elements have an electrically non-conductive carrier and the coupling sections are applied to the carrier.

8. A steering system for a vehicle, the steering system comprising the linear position sensor according to claim 1.

9. The steering system according to claim 8, wherein the at least two movable elements are arranged on a steering actuator rod of the steering system.

10. The steering system according to claim 8, wherein the steering system is designed as a steer-by-wire system having a control unit and an electromechanical actuator, wherein the control unit is coupled to the linear position sensor and is set up to convert the linear position detected by the linear position sensor into a steering command for the electromechanical actuator and transmit the steering command to the electromechanical actuator so that the electromechanical actuator performs a steering movement corresponding to the steering command.

11. The steering system according to claim 10, wherein the linear position sensor is at least partially arranged in or on a housing of a power unit of the steering system, which comprises at least the electromechanical actuator.

12. A vehicle comprising a steering system according to claim 8.

* * * * *